Feb. 11, 1964  R. W. ASTHEIMER ETAL  3,121,165
MULTIPLE DIRECTION INFRARED RADIOMETERS
Filed May 25, 1960  2 Sheets-Sheet 1

INVENTOR.
ROBERT W. ASTHEIMER
ARTHUR KAUFMAN
BY
ATTORNEY

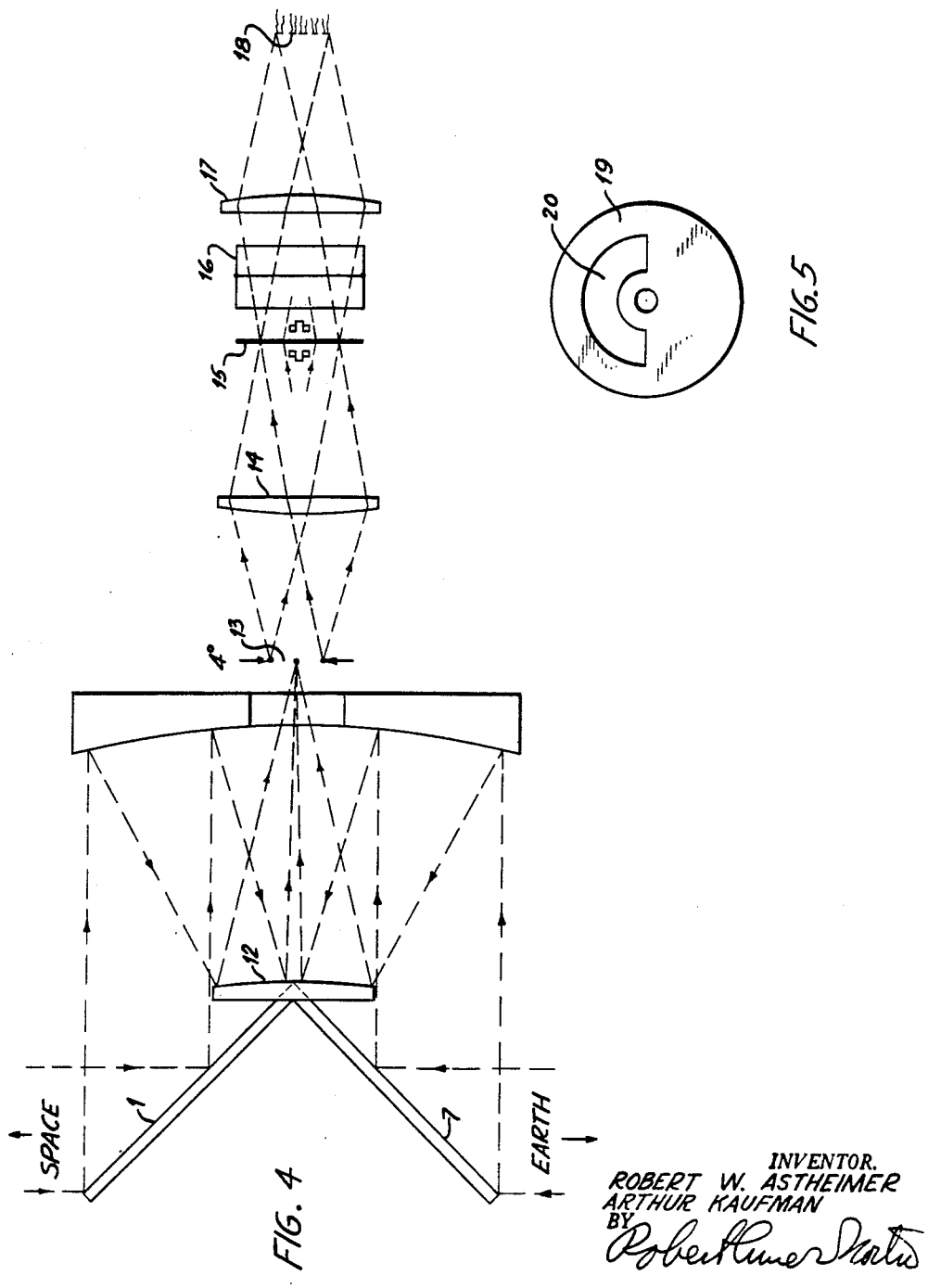

United States Patent Office 3,121,165
Patented Feb. 11, 1964

3,121,165
MULTIPLE DIRECTION INFRARED RADIOMETERS
Robert W. Astheimer, Westport, Conn., and Arthur Kaufman, Stamford, Conn. (4 Ambler Road, Westport, Conn.); said Astheimer assignor to Barnes Engineering Company, Stamford, Conn., a corporation of Delaware
Filed May 25, 1960, Ser. No. 31,663
5 Claims. (Cl. 250—83.3)

This invention relates to multiple direction infrared radiometers.

The usual infrared radiometer is provided with a detector and a chopping device which alternately permits the detector to receive radiation from a desired target area and from an internal reference source which is ordinarily a thermostated black body radiator maintained at a temperature somewhat above ambient. No problem is presented by the temperature of the chopping mechanism itself or of other parts of the instrument which may radiate to the detector because the comparison source is as hot or hotter than the instrument elements. These instruments have been highly developed and are of great practical utility. However, there are certain problems in which it is desired to use a reference source outside of the instrument. For example, in the case of some satellite instrumentation it is desirable to use space as a reference. In such a case the reference is of extremely low temperature and there may be a relatively much greater radiation from portions of the chopper or from other elements of the radiometer. This destroys the utility of the reference as a source of infrared radiation and introduces the problem of errors due to varying instrument temperatures. It is with such multi-directional infrared radiometers that the present invention deals.

Essentially such radiometers may be considered as having at least the following elements:

(1) Means for introducing radiation into the instrument from two or more directions. These means may involve catoptric or dioptric optical means or they may simply be windows.

(2) One or more radiation detectors.

(3) Means for alternately directing the beams onto each detector, preferably comprising chopping means.

(4) Common optical systems between each detector and its chopping means.

The radiometers may also contain other elements such as multiple detector arrays, exit slits with a single detector and scanning means, dispersing optics and the like.

Essentially the present invention eliminates problems from instrument temperature and particular chopper temperature by imaging on the detector the whole of the chopper or a symmetrical portion thereof. In other words, there are optics, usually a lens, in the path of the beams from the chopper to the detector. It makes no difference whether the chopper is a transmission chopper which will be used in instruments with in line optics or the chopper is a reflecter chopper alternately reflecting one beam and then the other onto a detector or where the chopper is part reflecting and part transmitting. In each case the detector sees the whole of the chopper at all times and hence the total radiation from the chopper itself remains constant and so is eliminated by the conventional A.C. circuits which are used in all radiometers employing chopping means.

Changing instrument temperatures and hence chopper temperature increases or decreases radiation from the chopper but this radiation is not chopped and so is not amplified or, putting it another way, the instrument, as far as its final responses are concerned, is blind to this radiation. As a result the instruments of the present invention use one or more external reference sources accurately and measurements are with respect to these sources and are independent of the instrument temperature or instrument temperature variations. This is even true when the chopper is much hotter and hence radiates more infrared energy. The reliability of the instrument is in no way changed and this automatic elimination of errors due to instrument temperature is achieved without any additional moving parts and without the addition of further elements.

The size of a radiometer is not changed by the present invention and the elimination of added weight or of delicate moving parts is of great importance in certain types of instruments, for example, those which must be subject to extreme accelerations or to other instruments which require a maximum of ruggedness.

The advantages of the invention have been described above in connection with instruments which utilize a very low temperature reference source. Multidirectional radiometers are not limited to such operations and may be used to compare two sources of fairly high temperature, for example, two portions of a given area of the same object may be compared. In every case a maximum of accuracy is obtained without regard to the temperature of the instrument itself.

The invention will be described in greater detail in conjunction with the drawings in which:

FIG. 4 is a cross section through a bidirectional radiometer using catoptric collecting means, and FIG. 5 is a plan view of the chopper.

The drawings illustrate bidirectional radiometers which are particularly useful for satellite instrumentation and the reference direction will be labelled "space" and the target direction "earth."

Figure 1:
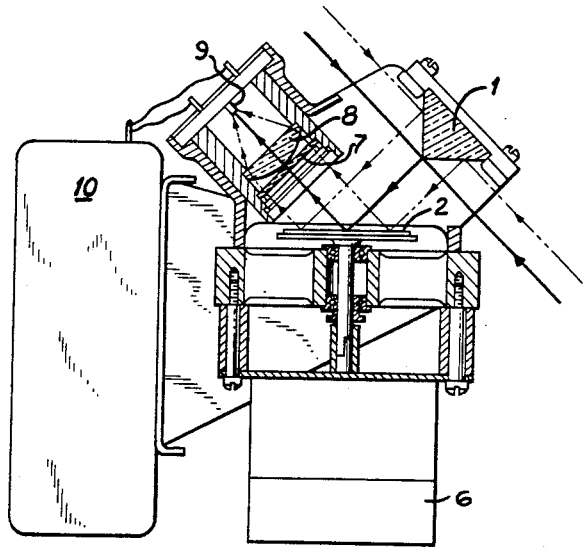
FIG. 1 is a cross section through a multiple bidirectional radiometer taken along the line 1—1 of FIG. 2.
Figure 2:
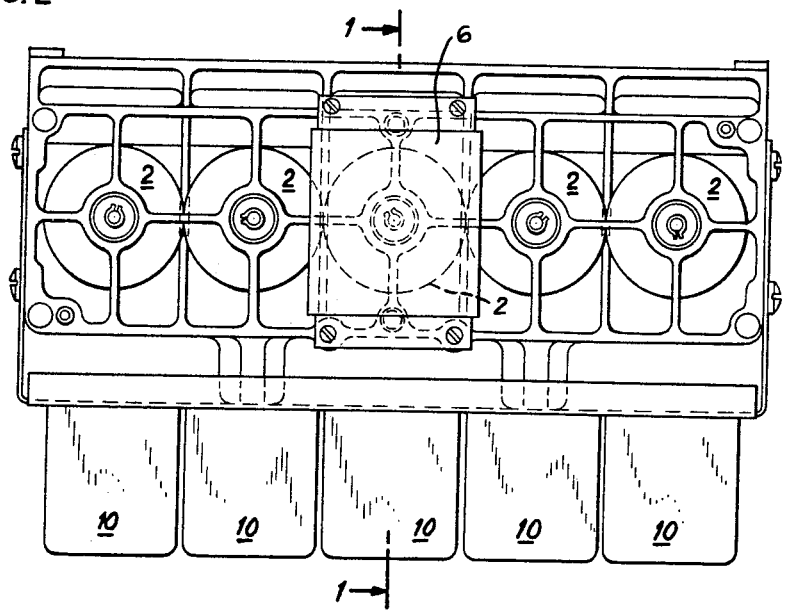
FIG. 2 is a plan view of the choppers taken from below.
Figure 3:
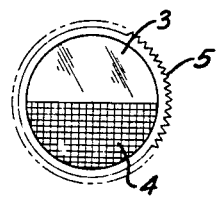
FIG. 3 is a detail plan view of a chopper.

Looking at the instrument shown in FIGS. 1 to 3 infrared radiation can come in from either of two directions striking a prismatic mirror 1. The two beams are reflected onto two sides of mirror choppers 2 (see FIG. 1). The chopper, as is shown in FIG. 3, is divided into two semi-circles, one mirrored 3 and the other black 4. The periphery of the chopper is provided with gear teeth 5, and, as will be seen from FIG. 2, five choppers mesh so that they are driven simultaneously. One chopper is driven by the motor 6 and this in turn drives the other four.

Returning now to FIG. 1 the two reflected beams pass through a filter 7 to select the band of infrared radiation desired, then through a lens 8 of suitable material which images the two beams alternately onto the detector 9. The detector is in the form of a conventional thermistor bolometer and puts out a signal at chopping frequency which is processed in electronic amplifier circuits 10 which produce an output signal which compares the radiation in the two beams. As the circuits are conventional and are the same as those used in other comparison radiometers they are not shown in detail since the particular circuit design and component values form no part of the present invention.

The same elements as described above are repeated for each of the five channels each one having its own electronic circuits. The channels differ only in the filters so that five regions of infrared radiation may be sampled. Except for a common prismatic mirror 1 and a drive motor 6 the five channels are entirely separate and are really five separate bidirectional radiometers.

It will be noted that the choppers in FIGS. 1 to 3 are purely reflective but as the detectors see the whole of each chopper, radiation from the chopper itself is not chopped and so is not processed by the electronic circuits. The accuracy of the output signal is substantially independent of chopper temperature.

FIGS. 4 and 5 illustrate a different modification of the present invention incorporating collecting optics and dispersing means. The instrument is an example of an in line instrument and uses a transmission chopper instead of a reflecting chopper. The same elements bear the same reference numerals. As in FIG. 1 radiation from the two directions strikes a double mirror 1 which in this case is made up of two separate mirrors instead of a solid prismatic mirror. The function, of course, is the same. The two beams then strike the primary mirror 11 of a Cassegrain collecting system, the secondary mirror being shown at 12. Both beams are imaged onto the plane of an entrance slit 13 which then acts as a secondary radiation source and defines the field of view. The slit may be fixed or adjustable and is shown in diagrammatic form as is the rest of the figure.

From the slit 13 the two beams pass through a collimating lens 14 through a transmission chopper 15 then through a dispersing prism 16 and a telescope lens 17 which images the slit 13 onto the detector 18.

The shape of the chopper is slightly different from that in FIG. 3 and is shown in FIG. 5 as a solid metal circle 19 provided with a semi-circular slot 20. This construction is simpler and more rugged for the type of in line instrument which is illustrated in FIGS. 4 and 5. The fact that the two parts of the chopper of FIG. 5 are not completely symmetrical as is the case in the reflecting chopper of FIG. 3 in nowise interferes with the performance of the function of the present invention. Sufficient of the chopper face to include the slot 20 is at all times imaged on the detector 18 and so radiations from the chopper itself are not chopped.

The output signal from the detector 18 passes through conventional A.C. electronic circuits as in the case of FIGS. 1 to 3 and since these circuits form no part of the present invention they are not shown. The prism 16 may be continuously adjustable to transform the instrument into a spectrometer or may be fixed so that a particular infrared wavelength or narrow wavelength band is imaged on the detector. From the standpoint of the present invention the dispersing means do not affect the principal function which is to eliminate response to radiation from the chopper at different temperatures. They are included in FIG. 4 to illustrate another type of instrument in which the present invention is useful. The invention may be visualized more clearly by pointing out that the new result is obtained by a location of chopper, detector and optics in such a manner that the detector always sees the whole of the chopper or rather a sufficient, usually symmetrical, portion of the whole so that the areas encountered by the two beams are fully covered.

It is not material to the present invention whether collecting optics of the catoptric type are used as in FIG. 4 or a simple mirror with no collecting optics as in FIG. 1. Also it should be pointed out that the invention is not limited to bidirectional radiometers. The mirrors may be arranged so there will be more than two directions, for example, there may be three directions, two viewing different targets and one viewing a reference source. When more than two directions are present, of course, the chopper must be further subdivided. Thus, if there are three directions the chopper will be divided into thirds instead of into halves and so on.

Although, as pointed out above, the present invention is applicable to transmission or reflecting choppers, there are some slight differences. In the case of the transmission chopper elimination of spurious radiations is practically complete. The detector sees the whole surface of the imaging lens and the whole variable surface of the chopper. Changes in temperature of either of these elements merely change the total radiation seen but as this is unchopped the instrument is blind to it. In the case of the reflecting chopper of FIGS. 1 to 3 theoretically reflection of radiations by the black surface 4 might introduce some kind of a spurious signal which would depend on instrument temperature. This is a theoretical consideration only because in any practical instrument reflection from a well blackened sector of a chopper is so small as to be below the useful response or resolution of the instrument. Therefore, while theoretically the instrument of FIGS. 4 and 5 might be considered more perfect for practical purposes it is a matter of almost complete indifference what type of chopper is used.

We claim:

1. A multidirectional infrared radiometer comprising in combination and in optical alignment,
    (a) entrance means for infrared beams from at least two radiation sources and from two fixed directions,
    (b) an infrared detector,
    (c) means for alternately selecting the beam from each direction and directing the selected beam onto the detector,
    (d) a common optical system between the detector and the beam selecting means which images at least an axially symmetrical portion of the selecting means on the detector, and
    (e) electronic processing circuits and means for connecting detector output to the input of the circuits.

2. A multidirectional radiometer according to claim 1 in which the means for selecting the beams comprises a rotary reflection chopper having alternate reflecting and nonreflecting sectors and an axis coincident with the optical axis of the common optical system.

3. A multidirectional radiometer according to claim 2 in which the entrance means include optical elements of uniform temperature and emissivity.

4. A multidirectional radiometer according to claim 3 in which the entrance means comprises a plurality of openings and a prismatic mirror reflecting the beams onto the chopper.

5. A multiple channel multiple direction radiometer according to claim 4 comprising a plurality of detectors, choppers and optic systems and an extended prismatic mirror which reflects the beams onto each of the choppers.

References Cited in the file of this patent

UNITED STATES PATENTS

| | | |
|---|---|---|
| 2,547,212 | Jamison | Apr. 3, 1951 |
| 2,583,143 | Glick | Jan. 22, 1952 |
| 2,710,559 | Heitermuller | Jan. 14, 1955 |
| 2,775,160 | Foskett et al. | Dec. 25, 1956 |
| 2,886,970 | Munker | May 19, 1959 |
| 2,974,230 | Harris | Mar. 7, 1961 |
| 2,999,152 | Gallagher et al. | Sept. 5, 1961 |
| 3,003,064 | Astheimer | Oct. 3, 1961 |
| 3,004,162 | Menke | Oct. 10, 1961 |
| 3,006,233 | Stiles | Oct. 31, 1961 |
| 3,034,405 | Biberman et al. | May 15, 1962 |
| 3,073,957 | Jones | Jan. 15, 1963 |
| 3,079,835 | Saperstein | Mar. 5, 1963 |